United States Patent [19]

Matsumoto et al.

[11] Patent Number: 4,555,761

[45] Date of Patent: Nov. 26, 1985

[54] DIRECTION DETECTION FOR A VEHICLE

[75] Inventors: Muneaki Matsumoto, Okazaki; Akira Kuno, Obu; Koji Numata, Toyokawa, all of Japan

[73] Assignee: Nippon Soken, Inc., Nishio, Japan

[21] Appl. No.: 465,188

[22] Filed: Feb. 9, 1983

[30] Foreign Application Priority Data

Feb. 12, 1982 [JP] Japan .................................. 57-19794

[51] Int. Cl.⁴ ...................... G06F 15/50; G01C 17/28
[52] U.S. Cl. .................................. 364/424; 364/449; 364/559; 33/356; 33/361
[58] Field of Search ............... 364/424, 444, 449, 451, 364/457, 460, 559, 571; 73/178 R, 505, 509, 510, 1 E; 340/988, 995; 33/356, 357, 361, 363 Q

[56] References Cited

U.S. PATENT DOCUMENTS

| | | | |
|---|---|---|---|
| 4,367,453 | 1/1983 | Kuno et al. | 364/424 |
| 4,402,050 | 8/1983 | Tagami et al. | 364/460 |
| 4,413,424 | 11/1983 | Sasaki et al. | 364/559 |
| 4,429,469 | 2/1984 | Tsushima et al. | 364/559 |

Primary Examiner—Gary Chin
Attorney, Agent, or Firm—Cushman, Darby & Cushman

[57] ABSTRACT

A device and method for detecting the running direction of an automotive vehicle includes terrestrial magnetic field direction detection, vehicle steering angle detection, and response to the signals of these detectors for producing the vehicle running direction signal. In a computer, or equivalent circuitry, occurrence of abnormalities of the terrestrial magnetic field is decided when the relationship between the change in the vehicle running direction and the change in the steering angle does not satisfy a predetermined requirement.

18 Claims, 6 Drawing Figures

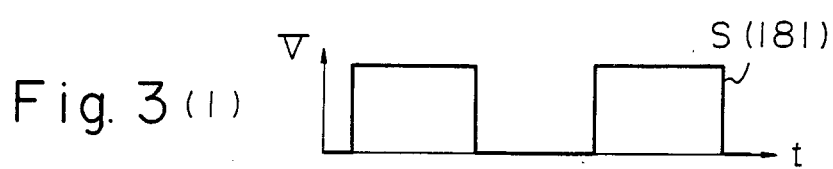
Fig. 3 (1)
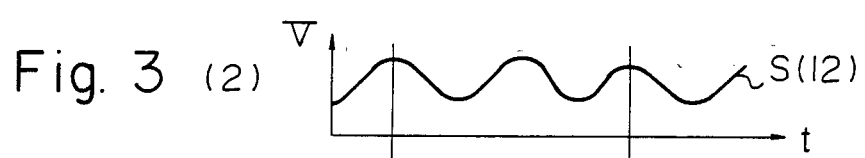
Fig. 3 (2)
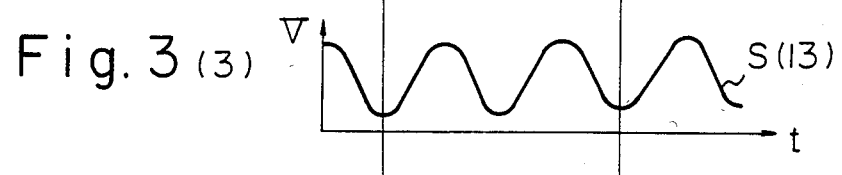
Fig. 3 (3)
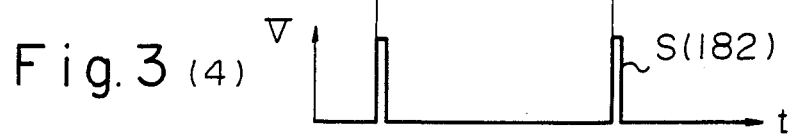
Fig. 3 (4)

DIRECTION DETECTION FOR A VEHICLE

BACKGROUND OF THE INVENTION

1. Field of the Invention

The present invention relates to a device and method for detecting the running direction of an automotive vehicle.

2. Description of the Prior Art

It is known that the distribution of the terrestrial magnetic field is disturbed when two automotive vehicles running in opposite directions pass by each other or when an automotive vehicle is running in a tunnel, beneath an overpass of a highway or a railway, or in a street surrounded by tall buildings.

Prior art methods for detecting the running direction of an automotive vehicle on the basis of the detection of the terrestrial magnetic field have suffered from the problem of having difficulty in correctly detecting the running direction the vehicle in regions where the distribution of the terrestrial magnetic field is disturbed.

SUMMARY OF THE INVENTION

It is the object of the invention to provide improved detection the running direction of an automotive vehicle in which the determination of abnormalities of the terrestrial magnetic field is carried out and reliable detection of the running direction is ensured.

According to one aspect of the present invention, a device in accordance with this invention may be provided for detecting the running direction of an automotive vehicle, including: a direction detector for detecting the direction of the terrestrial magnetic field; a steering angle detector for detecting the steering angle of the automotive vehicle; and a computer receiving the signals from the direction detector and the steering angle detector for calculating in sequence the running direction of the automotive vehicle; wherein, the computer determines the occurrence of abnormalities of the terrestrial magnetic field when the relationship between the change in the automotive vehicle running direction derived from the direction detection signal from the direction detector and the change in the steering angle derived from the steering angle signal from the steering angle detector does not satisfy a predetermined requirement.

BRIEF DESCRIPTION OF THE DRAWINGS

In the drawings.

FIGS. 3(1)–3(4) illustrate the waveforms of selected signals appearing in the device of FIG. 1.

DESCRIPTION OF THE PREFERRED EMBODIMENTS

Figure 1:
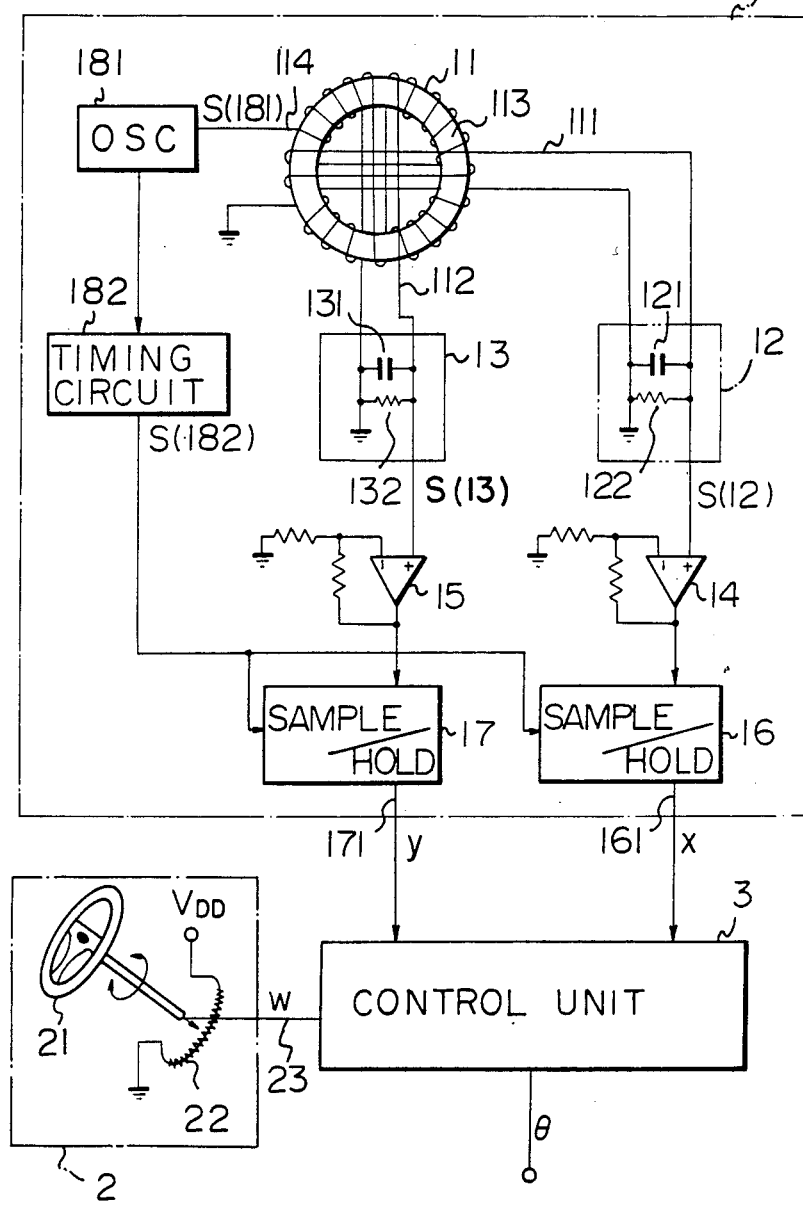
FIG. 1 illustrates a device for detecting the running direction of an automotive vehicle according to an embodiment of the present invention.

A device for detecting the running direction of an automotive vehicle according to an embodiment of the present invention is shown in FIG. 1. The device of FIG. 1 includes of a direction detection portion 1, a steering angle detection portion 2, and a control unit 3.

The direction detection portion 1 includes a direction sensor 11 having a magnetic core 113, an exciting winding 114, and output windings 111 and 112, a filter 12 having a capacitor 121 and a resistor 122; a filter 13 having a capacitor 131 and a resistor 132; amplifiers 14 and 15; sample/hold circuits 16 and 17; an oscillator 181; and a timing circuit 182.

The exciting winding 114 is wound along the circular magnetic path of the magnetic core 113. The output windings 111 and 112 are wound around the magnetic core 113 in crossed diametral directions.

The oscillator 181 produces rectangular wave signal S(181) (FIG. 3, (1)) of frequency f to excite the exciting winding 114. The magnetic field in the magnetic core 113 is changed in accordance with the sum H+h of the horizontal component H of the terrestrial magnetic field and the horizontal component h of the distortion of the terrestrial magnetic field. A signal which is proportional to the magnetic field in the magnetic core 113 is produced from each of the output windings 111 and 112. The produced signals are supplied to the filters 12 and 13 which produce output signals S(12) and S(13) (FIG. 3, (2) and (3)) of frequency 2f. The signals S(12) and S(13) are amplified by the amplifiers 14 and 15. The sampling and holding is carried out in the sample/hold circuits 16 and 17 for the signals from the amplifiers 14 and 15 by using the signal S(182) (FIG. 3, (4)) from the timing circuit 182. Hence, direction detection signals x and y are produced from the output terminals 161 and 171 of the sample/hold circuits 16 and 17.

The steering angle detection portion 2 includes a variable resistor 22, a variable terminal 23 of which is driven in accordance with the rotation of the shaft of a steering wheel 21 of the automotive vehicle. The steering angle signal W which corresponds to the steering angle is delivered from the variable terminal 23.

The control unit 3 receives the direction detection signals x and y from the direction detection portion 1 and the steering angle signal W from the steering angle detection portion 2 and carries out the calculation to produce a direction signal corresponding to the running direction of the automotive vehicle. A computing device in the form of a microcomputer can be used for the control unit 3.

An example of the calculation in such a computing device will be explained with reference to the flow chart of FIG. 2. In the flow chart of FIG. 2, "i" is a number which indicates the achievement of at least one calculation of the automotive vehicle running direction and steering angle steering after switching-on of the power source. That is, "i=0" represents the status immediately after the switching-on of the power source, and "i=1" represents the status after at least one calculation of the automotive vehicle running direction and steering angle signal while the power source is in the ON state.

Figure 2:
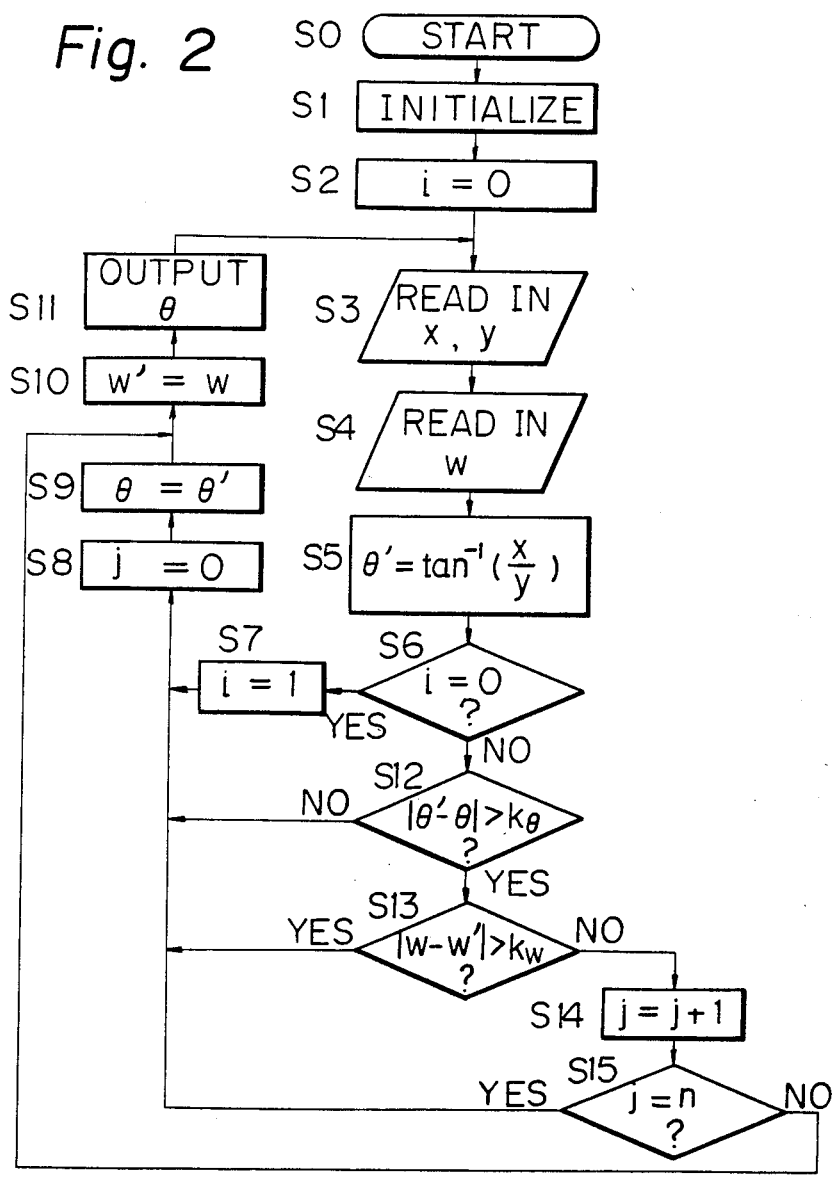
FIG. 2 illustrates a flow chart of the operation of the control unit in the device of FIG. 1 (i.e. part of the methodology of this invention)

In the flow chart of FIG. 2, "j" is the number of sequential occurrences of abnormalities of the terrestrial magnetic field. That is, "j=0" represents the normal state, "j=1" represents one detection of abnormalities, and "j=m" represents the m-number sequential detections of abnormalities.

In the flow chart of FIG. 2, "n" is the number of the occurrences of resetting operations.

In step S0, the routine is started by switching on the power source to the direction detection portion 1. In step S1, a number of constants $K_\theta$, $K_w$, j, n, and the like are initialized. Constants $K_\theta$ and $K_w$ are predetermined constants. Constant n is selected, for example, as "10".

In step S2, the sequential number i is made equal to "0". In step S3, the direction detection signals x and y from the direction detection portion 1 are read in. In step S4, the steering angle signal W from the steering angle detection portion 2 is read in. In step S5, the automotive vehicle running direction $\theta'$ is obtained by calculations according to the equation below:

$$\theta' = \tan^{-1}(x/y)$$

In step S6, the decision as to whether or not i is equal to "0" is carried out.

When the decision is YES, the routine proceeds to step S7, where i is made equal to "1". In step S8, j is made equal to "0". In step S9, $\theta$ is replaced by the calculated $\theta'$, and the replaced value $\theta'$ is stored.

In step S10, the preceding value W' of the steering angle detection is replaced by the read-in value W, and the replaced value W is stored. In step S11, the signal of $\theta$ is output as the direction signal to conclude the first routine. Next, the routine returns to step S3.

Steps S3, S4, S5, and S6 are again carried out. In this case, since i has been made equal to "1", the decision of step S6 is NO. Hence, the routine proceeds to step S12. In step S12, the decision as to whether the absolute value of "$\theta'-\theta$" is greater than $K_\theta$ is carried out.

When the decision is NO, that is $|\theta'-\theta| \leq K_\theta$, the routine proceeds to step S8 and repeats steps S8, S9, S10, and S11.

When the decision is YES, the routine proceeds to step S13. In step S13, the decision as to whether or not the absolute value of "W−W'" is greater than $K_w$ is carried out.

When the decision is YES, that is $|W-W'| > K_w$, the routine proceeds to step S8, repeats steps S8 through S11, and returns to step S3.

When the decision is NO, that is $|W-W'| \leq K_w$, the routine proceeds to step S14, where j is increased by "1". In step S15, the decision as to whether or not j is equal to n is carried out.

When the decision is NO, that is $j \neq n$, the routine proceeds to step S10, repeats steps 10 and 11 to deliver the signal of $\theta$ stored at the time j=0, and returns to step S3.

When the decision is YES, that is j=n, the routine proceeds to step S8 to repeat steps S8 through S11. This means that the abnormality detections of $\theta$ have occurred n resetting number of times in sequence. Suppose that such abnormality is caused by, for example, the slipping of the vehicle wheels. In this case, in step S10, W' is replaced by W corresponding to timing j=n, and, in step S9, $\theta$ is replaced by $\theta'$ corresponding to timing j=n. The replaced $\theta'$ is stored, then the signal of $\theta$ is output as the direction signal.

The meaning of the routine of steps S12, S13, S14, and S15 is as follows. When the amount of change of the automotive vehicle running direction is greater than a predetermined value (i.e. the step S12 test of whether $|\theta'-\theta| > K_\theta$) in spite of the fact that the amount of change of the steering angle is less than or equal to a predetermined value (i.e. equivalent to the step S13 test of whether $|w-w'| > K_w$), it is decided that the terrestrial magnetic field is in an abnormal condition. Thus, the signal of the automotive vehicle running direction corresponding to timing j=0 is output. However, when abnormality detections of the automotive vehicle running direction have occurred n number of times in sequence, it is decided that the finally obtained automotive vehicle running direction $\theta'$ which corresponds to timing j=n is normal. Thus, this finally obtained automotive vehicle running direction $\theta'$ is output as the automotive vehicle running direction signal.

Although the preferred embodiment of the present invention has been described heretofore, various modifications and alterations of the embodiment are possible without departing from the scope of the present invention. For example, although a magnetic flux gate sensor of the ring core type is used as the direction sensor 11 in the above-described embodiment, it is possible to use magnetic flux gate sensors of other types, a Hall-effect element, or the like instead.

Although a variable resistor is used in the steering angle detection portion 2, it is possible to use a sensor of the magnetic type, a sensor of the capacitance change type, or the like instead. For the control portion 3, a calculation circuit of an analog type including, for example, an analog comparator, an analog addition circuit, and an analog subtraction circuit can be used instead of a microcomputer.

Also, it is possible to provide an alarm unit such as a light emitting diode, or a buzzer to draw the driver's attention to the occurrence of abnormalities of the terrestrial magnetic field. Also, it is possible to separate the control portion into one part in which the calculation of the automotive vehicle running direction is carried out and the other part in which the decision of the occurrence of abnormalities of the terrestrial magnetic field is carried out.

Also, it is possible to decide the occurrence of the abnormalities of the terrestrial magnetic field when the amount of the change of the automotive vehicle running direction is less than a predetermined value (i.e., $|\theta'-\theta| \leq K_\theta$), in spite of the fact that the amount of the change of the steering angle is greater than a predetermined value (i.e., $|w-w'| > K_w$).

We claim:

1. A device for detecting running direction of a vehicle, comprising:

direction detecting means for detecting direction of the terrestrial magnetic field and outputting first and second detection signals indicative thereof;

steering angle detecting means for detecting steering angle of said vehicle and outputting a steering angle signal indicative thereof; and control unit means responsive to said first and second signals and said steering angle signal, for calculating said running direction of said automotive vehicle based on said first and second signals and for determining the occurrence of abnormalities in said terrestrial magnetic field based on all of said signals.

2. A device as in claim 1, wherein said control unit means includes:

means for reading in said first and second direction detection signals, x and y respectively;

means for reading in said steering angle signal, W; and means for calculating said vehicle running direction, $\theta$, from said read-in signals x and y.

3. A device as in claim 2, wherein said control unit means includes first deciding means for deciding whether the absolute value of the difference between two consecutive calculated vehicle running direction signals is greater than a predetermined amount $K_\theta$.

4. A device as in claim 3, wherein said control unit means further includes second deciding, means for deciding whether the absolute value of the difference between two consecutive read-in steering angle signals is greater than a predetermined amount $K_w$.

5. A device as in claim 4, wherein said control unit means includes means responsive to said first and second deciding means for determining an occurrence of one of said abnormalities whenever said first deciding means decides in the affirmative and said second deciding means decides in the negative.

6. A device as in claim 4, wherein said control unit means includes means responsive to said first and second deciding means for determining an occurrence of one of said abnormalities whenever said first deciding means decides in the negative and said second deciding means decides in the affirmative.

7. A device for detecting a running direction of a vehicle, comprising:
  direction detection means attached to said vehicle for detecting the direction of the terrestrial magnetic field;
  turning angle detection means for detecting the turning angle of said vehicle;
  first calculation means, receiving said detection from said direction detection means, for calculating successively the running direction of said vehicle;
  memory means for storing said running direction calculated in said first calculation means;
  second calculation means for determining the change in said running direction on the basis of said running direction calculated in said first calculation means and said running direction stored in said memory means, and for determining whether the relationship between said determined change in said running direction and variation in said detected vehicle turning angle is not within a predetermined relationship, and for determining an abnormality of said terrestrial magnetic field direction detection when the result of said relationship determination is affirmative; and
  means for prohibiting updating of data in said memory means when said abnormality is determined by said second calculation means.

8. A device according to claim 7, further comprising signal output means for producing said vehicle running direction signal on the basis of vehicle running direction data stored in said memory means.

9. A device according to claim 7, wherein said turning angle detection means comprises a steering angle detection means for detecting the steering angle of said vehicle.

10. A device according to claim 7, wherein said second calculation means comprises a first detection means for detecting whether said change in said vehicle running direction exceeds a first reference value, and a second detection means for detecting whether said variation in said vehicle running direction exceeds a second reference value, said abnormality of said terrestrial magnetic field being decided when the detection by said first detection means is affirmative and the detection by said second detection means is negative.

11. A device according to claim 10, further including means for overriding said prohibiting means so as to permit updating of said data in said memory means when accumulation of a number of said abnormalities attains a predetermined detection condition.

12. A device according to claim 11, wherein said predetermined detection condition is a predetermined number.

13. A method for detecting a running direction of a vehicle, comprising the steps of:
  detecting a direction of the terrestrial magnetic field;
  detecting a steering angle direction of the vehicle;
  calculating a running direction of the vehicle based on the detected terrestrial magnetic field direction; and
  determining the occurrence of an abnormality in the terrestrial magnetic field based on the detected terrestrial magnetic field direction and the detected steering angle direction.

14. A method as in claim 13, wherein the calculating step includes the step of performing the calculation:

$$\theta = \tan^{-1}(x/y),$$

where x and y are detected signals indicative of the terrestrial magnetic field, and $\theta$ is by definition the calculated vehicle running direction.

15. A method as in claim 14, wherein said determining step includes the step of determining whether the absolute value of the difference between two consecutive vehicle running direction calculations is greater than a predetermined amount $K_\theta$.

16. A method as in claim 15, wherein said determining step further includes the step of determining whether the absolute value of the difference between two consecutive steering angle direction detections is greater than a predetermined amount $K_w$.

17. A method as in claim 16, wherein said determining step further includes the step of indicating the occurrence of one of the abnormalities whenever said determining step including $K_\theta$ yields affirmative and said determining step including $K_w$ yields negative.

18. A method as in claim 16, wherein said determining step further includes the step of indicating the occurrence of one of the abnormalities whenever said determining step including $K_\theta$ yields negative and said determining step including $K_w$ yields affirmative.

* * * * *

UNITED STATES PATENT AND TRADEMARK OFFICE
CERTIFICATE OF CORRECTION

PATENT NO. : 4,555,761

DATED : November 26, 1985

INVENTOR(S) : MATSUMOTO et al

It is certified that error appears in the above-identified patent and that said Letters Patent is hereby corrected as shown below:

Column 4, line 60, "$\theta$" should read --$\theta'$--

Signed and Sealed this

Fifteenth Day of July 1986

[SEAL]

Attest:

Attesting Officer

DONALD J. QUIGG

Commissioner of Patents and Trademarks